United States Patent
Rosse et al.

(10) Patent No.: US 7,524,178 B2
(45) Date of Patent: Apr. 28, 2009

(54) DEVICE FOR MANUFACTURING A GRANULAR PRODUCT BY EXTRUSION AND CUTTING

(75) Inventors: Meinrad Rosse, La Tour de Peilz (CH); Julien Gaillard, La Conversion (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 11/995,807

(22) PCT Filed: Jul. 13, 2006

(86) PCT No.: PCT/EP2006/006871

§ 371 (c)(1), (2), (4) Date: Jan. 15, 2008

(87) PCT Pub. No.: WO2007/009663

PCT Pub. Date: Jan. 25, 2007

(65) Prior Publication Data

US 2008/0233224 A1  Sep. 25, 2008

(30) Foreign Application Priority Data

Jul. 20, 2005  (EP)  ........................ 05015752

(51) Int. Cl.
*B29B 9/06* (2006.01)
(52) U.S. Cl. ........................................ 425/313
(58) Field of Classification Search ............. 425/67, 425/310, 311, 313
See application file for complete search history.

(56) References Cited

U.S. PATENT DOCUMENTS

| 3,645,200 | A | | 2/1972 | Craddock et al. |
| 4,060,645 | A | | 11/1977 | Risler et al. |
| 4,099,900 | A | * | 7/1978 | Bradbury et al. ............ 425/313 |
| 5,338,559 | A | * | 8/1994 | Schaaf ........................ 425/313 |
| 5,611,983 | A | * | 3/1997 | Ma et al. ..................... 425/313 |
| 5,888,558 | A | * | 3/1999 | Janot et al. ................... 425/313 |
| 6,537,050 | B1 | | 3/2003 | Kasai et al. |

FOREIGN PATENT DOCUMENTS

| CH | 600802 | 6/1978 |
| EP | 0124505 | 11/1984 |
| FR | 2080966 | 11/1971 |
| FR | 2782465 | 2/2000 |

* cited by examiner

*Primary Examiner*—James Mackey
(74) *Attorney, Agent, or Firm*—K&L Gates LLP

(57) ABSTRACT

The invention relates to a device for manufacturing a granular product by extrusion and cutting, comprising an extruder provided with at least one extrusion die exhibiting an extruder face in which extrusion orifices open, a rotationally driven cutting head comprising at least two cutter blades designed to move past the orifices, characterized in that the blades are at least of two types and are arranged in such a way as to project the said granular product, after cutting, in at least two different projection cones.

8 Claims, 5 Drawing Sheets

DEVICE FOR MANUFACTURING A GRANULAR PRODUCT BY EXTRUSION AND CUTTING

The present invention relates to a device for manufacturing a granular product by extrusion and cutting. More specifically, the present invention relates to such a device that makes it possible to increase the rate of production of granular product over devices of the prior art.

Such devices can be used in particular for manufacturing products made up of grains such as those obtained by implementing the method described in Patent CH 600 802 which relates to the manufacture of dehydrated food products. According to that method, a food substance in the form of a powder or a paste is extruded through a die into an enclosure in which the pressure is subatmospheric. In this way, several sausages are formed that are cut into grains as they leave the extrusion bushings of the die, using a rotary cutting head generally provided with three cutters each forming the same cutting angle with the exit face of the die. Extrusion is preferably performed in an evacuated enclosure to make it possible to obtain, at a modest temperature, an expanded texture of the product thanks to the sudden elimination of some of the water in the form of vapour and of the gases initially contained in the extrusion mass. By cutting very close to the extrusion bushings, the cut edges continue to swell and it is thus possible to obtain grains in the form of spheroids or ovoids for example. The grains obtained all have more or less the same shape and size, without large or fine particles. Thus, a far more uniform particle size distribution is obtained than can be obtained using devices in which the extruded sausages are crushed once they have hardened.

It will be noted that the applications of these devices are not restricted to the manufacture of food products but may extend to granular products of any kind, whether extrusion and cutting are performed under vacuum or at atmospheric pressure.

In order to meet the customers' increasing demand for these grain products, the Applicant Company has sought to increase the rate of manufacture. To do this, the Applicant Company has increased the extrusion rate and the number of extrusion bushings. Now, the Applicant Company has become aware that, through these simple measures, the grains ejected after cutting had a tendency to clump together in clusters or strings that were difficult to separate, something which, on the one hand, would disrupt the subsequent flow of the grains through the plant and would lead to a reduction in the output of the plant rather than to the desired increase and, on the other hand, would have an adverse effect on the shape and appearance of the extruded grains.

It is an object of the present invention to remedy the aforementioned disadvantages together with others still by supplying a device for manufacturing a granular product by extrusion and cutting that makes it possible to achieve product production flow rates markedly higher than the devices of the prior art.

Another object of the invention is to provide such a device which is simple in design, economical and easy to use.

To this end, the invention relates to a device for manufacturing a granular product by extrusion and cutting, comprising an extruder provided with at least one extrusion die exhibiting an extruder face in which extrusion orifices open, a rotationally driven cutting head comprising at least two cutter blades designed to move past the orifices, this device being characterized in that the blades are at least of two types and in that they are arranged in such a way as to project the said granular product, after cutting, in at least two different projection cones.

The Applicant Company has actually found that the phenomenon whereby the grains club together in the enclosure into which they are projected after cutting results from the fact that the grains, density in the volume into which they are ejected is too high and that this volume is defined by the geometry of the cutters.

The Applicant Company therefore proposes to remedy this disadvantage by arranging the cutter blades of the cutting head in such a way that the cut grains are projected and distributed into several regions of the enclosure rather than concentrated into a single region as they were in devices of the prior art. It is thus possible to use the volume of the enclosure into which the cut grains are ejected optimally, allowing an increase in production rates without leading to the formation of clusters of grains in the enclosure. This arrangement therefore limits or even eliminates the risk of subsequent blockages of the production plant due to these clusters.

According to a preferred embodiment of the invention, the cutter blades each have a first face facing the extrusion face and a second face intersecting the first face in such a way as to form a cutting edge and which is inclined with respect to the said extrusion face, each type of blade differing from another type of blade in that the inclined second face of the blade has a different inclination.

Thus, by virtue of this arrangement, the dispersion of the extruded products through the volume of the enclosure is improved in a simple way in as much as the extruded product is projected under vacuum in projection cones specific to the respective angles of the blades of the cutters.

According to another characteristic of the invention, two successive blades of the cutting head are of different types.

According to yet another characteristic of the invention, the cutting head comprises a plurality of blades arranged in pairs, the blades of the same type being diametrically opposite one another with respect to the axis of rotation of the cutting head thus making dynamic balancing of the cutting head easier.

BRIEF DESCRIPTION OF THE DRAWINGS

Other characteristics and advantages of the invention will become more clearly apparent from the detailed description which follows of one exemplary embodiment of the cutting head according to the invention, this example being merely given purely by way of nonlimiting illustration in conjunction with the attached drawing in which.

Figure 1:
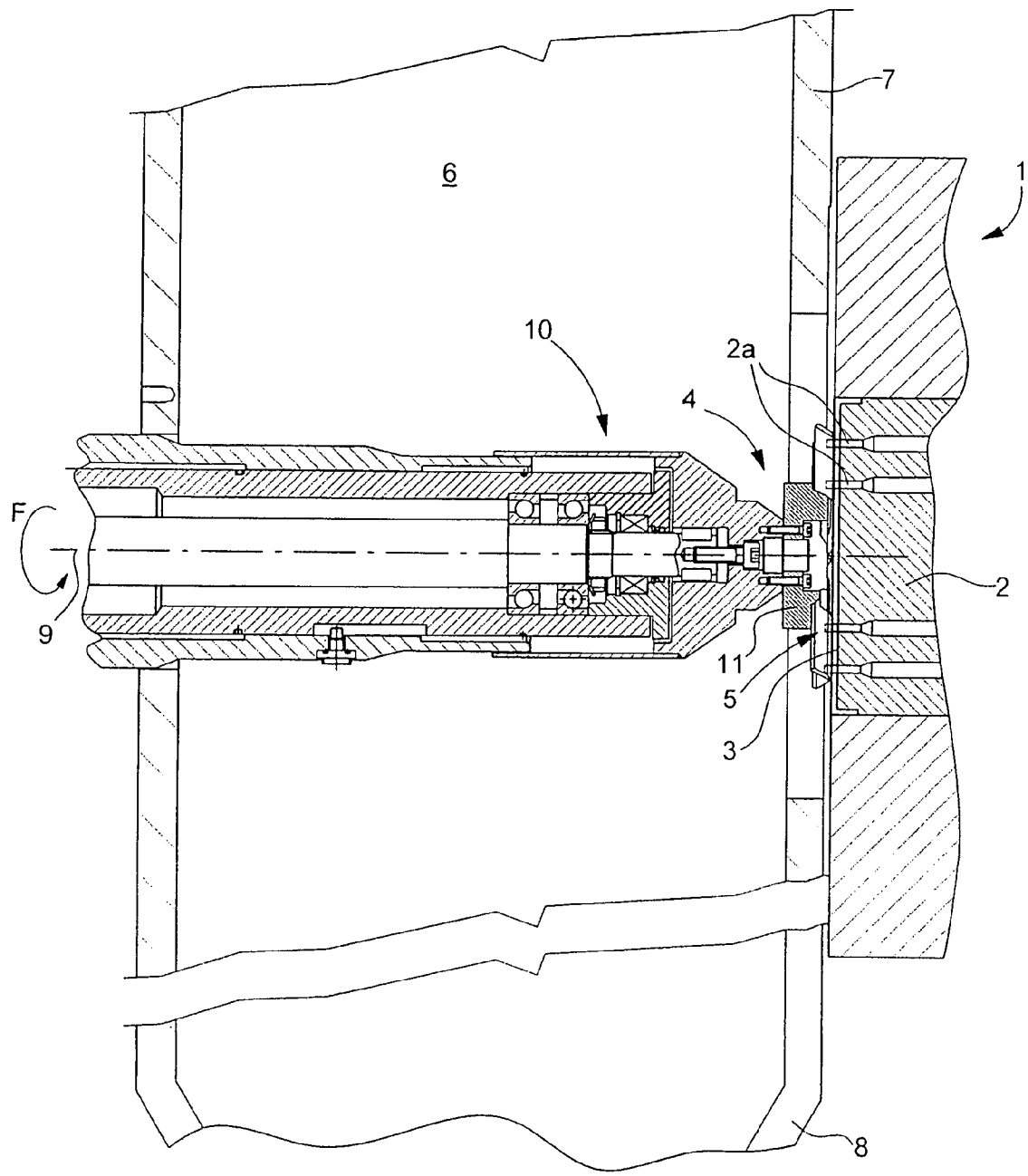
FIG. 1 is a simplified part view in cross section of the device according to the invention.
Figure 2:
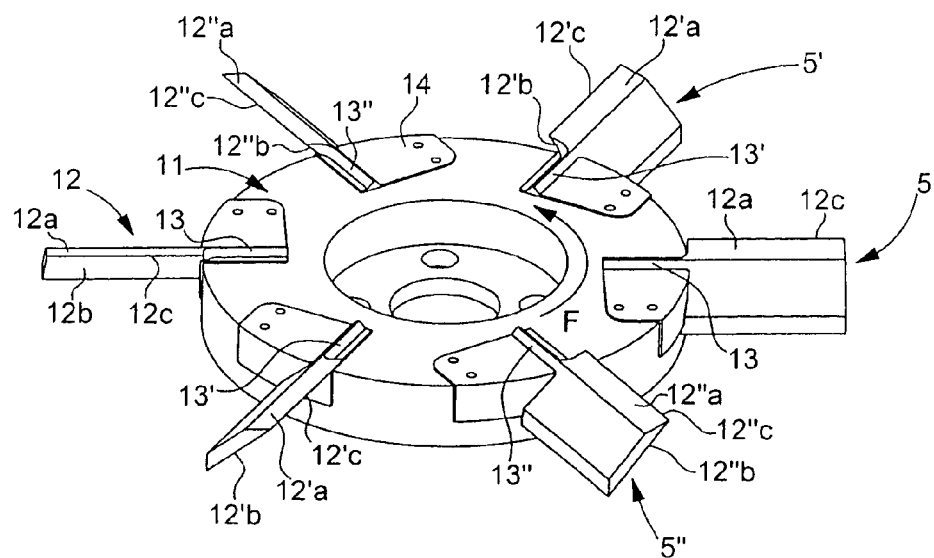
FIG. 2 is a perspective view of an embodiment involving three pairs of cutters of the cutting head used in the device according to the invention.

With reference to the drawings and, in particular, to FIGS. 1 and 2, an extruder 1 of known type comprises, at its exit, at least one extrusion die 2 the orifices 2a of which are distributed in two circles and open onto a flat surface 3 known as the extrusion face. Facing this surface 3 there is a rotary cutting head 4 provided with cutters 5 arranged in such a way as to cut the sausages of extruded substance leaving the die 2.

The cutting head 4 lies inside a chamber 6 designed to be kept at a subatmospheric pressure by virtue of a vacuum pump (not depicted). The enclosure of this chamber is depicted schematically by a peripheral wall 7 and a lower hopper 8 into which the granular products manufactured by the device described here drop and are collected by means of an extractor allowing the vacuum in the chamber 6 to be maintained. The seal between the extruder 1 and the wall 7 is afforded by means which have not been depicted.

The cutting head 4 rotates, in the direction of the arrow F, about an axis 9 perpendicular to the face 3 of the extruder. It is mounted on the end of a shaft 10 the other end of which is coupled to the shaft of an electric motor (not depicted).

Figure 3:
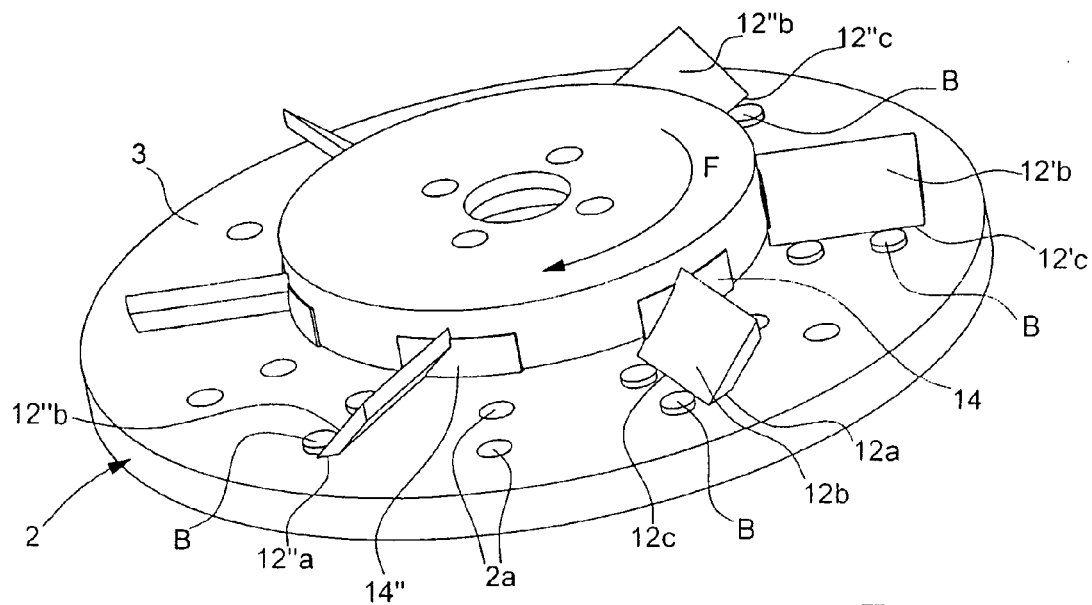
FIG. 3 is a view in elevation and in perspective of the cutting head in relation to the extrusion die.

In operation, the motor turns the shaft 10 and the cutting head 4 at an adjustable speed which may for example range up to 5 000 revolutions per minute. The pasty product extruded in the hot state by the extruder 1 forms, as it leaves each orifice 2a of the die 2, a sausage B which is immediately cut into roundels by the cutters 5 (FIG. 3). As the extruded product contains water vapour and possibly other gases as was explained above, the roundels swell in the evacuated chamber 6 and solidify in the form of grains which drop into the hopper 8. The size, shape and rate of manufacture of the grains can be adjusted by, for example, adjusting the speed of the extruder 1, the speed of the motor, or the pressure in the chamber 6.

Figure 4:
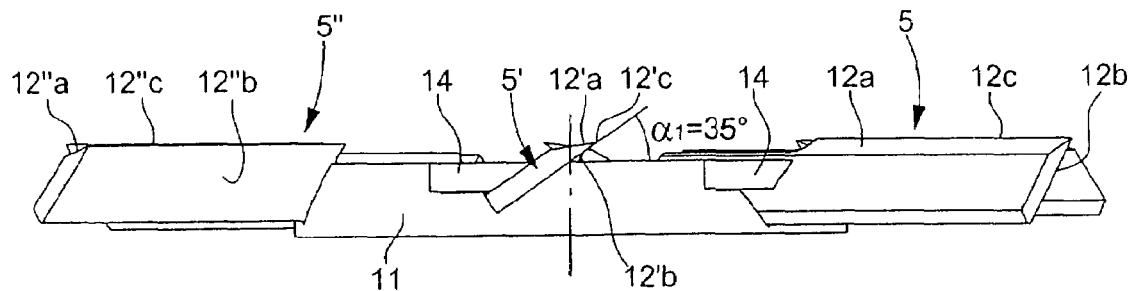
FIGS. 4 to 6 illustrate side views of the cutting head depicted in FIG. 2, respectively showing the three orientations of the cutter blades with respect to the extrusion face, and FIGS. 7 and 8 schematically show the dispersion of the extruded products in two different projection cones specific to the respective angles of the blades of the cutters, from two extrusion orifices aligned on the same radius of the extrusion die.
Figure 5:
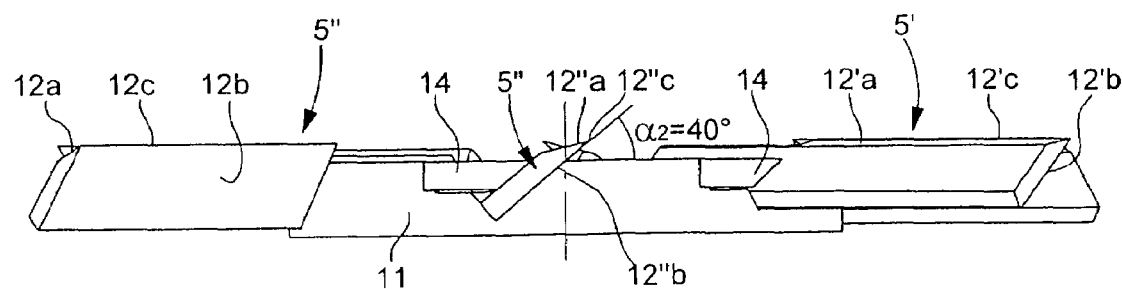
Figure 6:
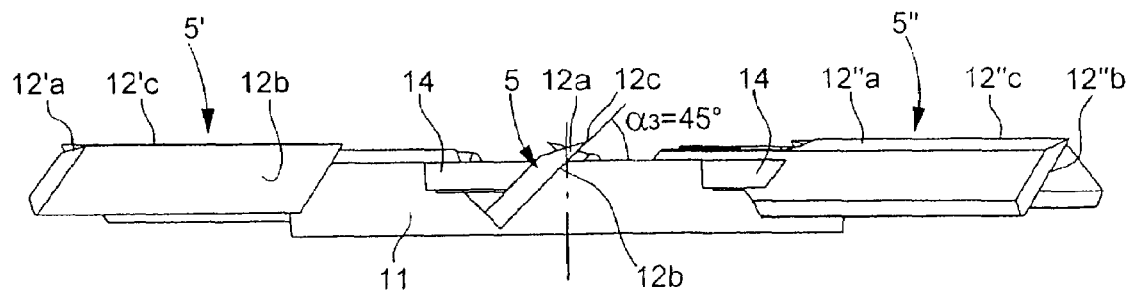

One embodiment of the rotary cutting head 4 is depicted in FIGS. 2 and 3. Essentially, it comprises a circular support 11 on which there are fixed several cutters 5 which extend radially outwards from the perimeter of the support 11. Each of these cutters 5, 5', 5" is made up of a cutting blade 12, 12', 12" having a cross section of more or less trapezoidal shape arranged tangentially to the said support 11 and fixed to the latter via an arm 13, 13', 13" intercalated in an appropriate housing of the circular support 11 and of a clumping plate 14 pierced with two holes for screwing or riveting it to the circular support 11. As can be seen from examining FIGS. 2 and 3, each of the blades 12, 12', 12" of the cutters 5, 5', 5" have two faces, 12a, 12'a, 12"a and 12b, 12'b, 12"b respectively, the first of these faces 12a, 12'a, 12"a facing the extrusion face 3, while the second face 12b, 12'b, 12"b, which intersects the first face 12a, 12'a, 12"a in such a way as to form a cutting edge 12c, 12'c, 12"c, is inclined with respect to the said extrusion face 3 by an angle $\alpha 1$, $\alpha 2$, $\alpha 3$ (FIGS. 4, 5 and 6). The cutters 5, 5', 5" will typically be made of tempered steel or any other material suitable for producing cutting tools, such as ceramic for example.

According to a variant, it would of course be possible to anticipate producing the circular support 11 as a single piece with the cutters 5, 5', 5".

In a simplified embodiment variant which has not been depicted, the cutting head 4 comprises just two cutters 5 preferably mounted diametrically opposite each other on the circular support 11, these two cutters 5 being of different types which, within the meaning of the invention, means that the inclination of the second face 12b of the first cutter with respect to the extrusion face 3 differs from the inclination of the second face of the cutter opposite. As the two cutters are not strictly identical, it will be understood that such an arrangement will need to be balanced using a balancing weight in order to guarantee dynamic equilibrium of the cutting head 4. This is all the more necessary since the rotational speeds of the cutting head 4 are high and the slightest imbalance would damage the shaft 12 and the drive means.

In the example depicted in FIG. 2, the cutting head 4 bears six uniformly spaced cutters 5, 5', 5", two successive cutters 5, 5'; 5', 5"; 5", 5 being of different types, that is to say that the inclination, with respect to the extrusion face 3, of the second face 12b of a given cutter 5 differs from the inclination of the second face 12'b of the next cutter 5'. As a preference, and as is apparent from FIG. 2, the cutters 5, 5', 5" are paired together. In other words, two cutters 5 of the same type, that is to say in which the inclination of the second faces 12b of the blades 12 with respect to the extrusion face 3 are the same, are arranged diametrically opposite each other with respect to the axis of rotation of the cutting head 4.

The angle of inclination $\alpha 1$, $\alpha 2$, $\alpha 3$ of the second face of each blade with respect to the surface of the extrusion face is chosen between 15° and 75°. In the knowledge that the choice of angle also dictates the quality of the cut and the possibility of re-sharpening the blades, angles of between 30° and 60° inclusive will preferably be chosen.

Figure 7:
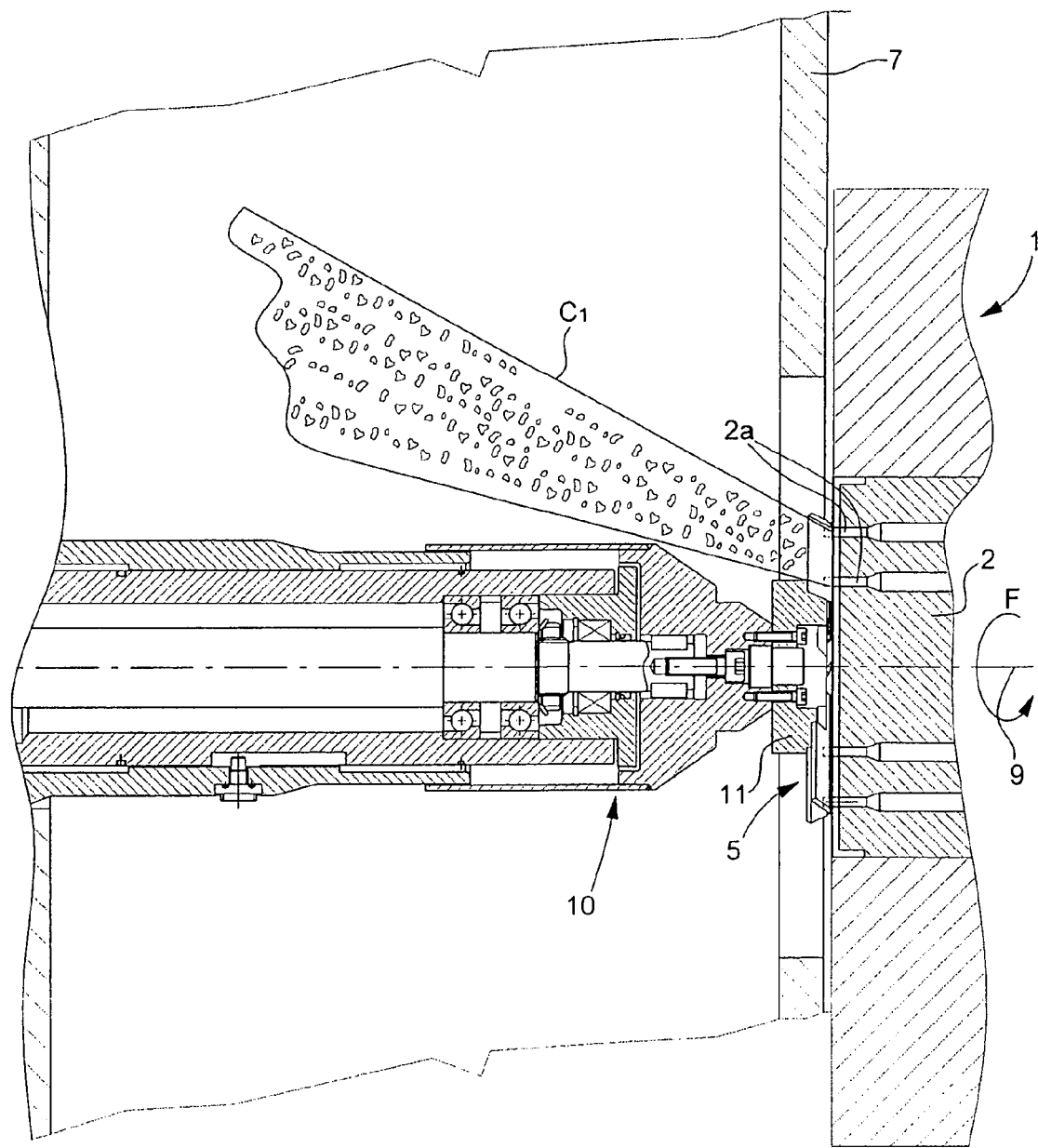
Figure 8:
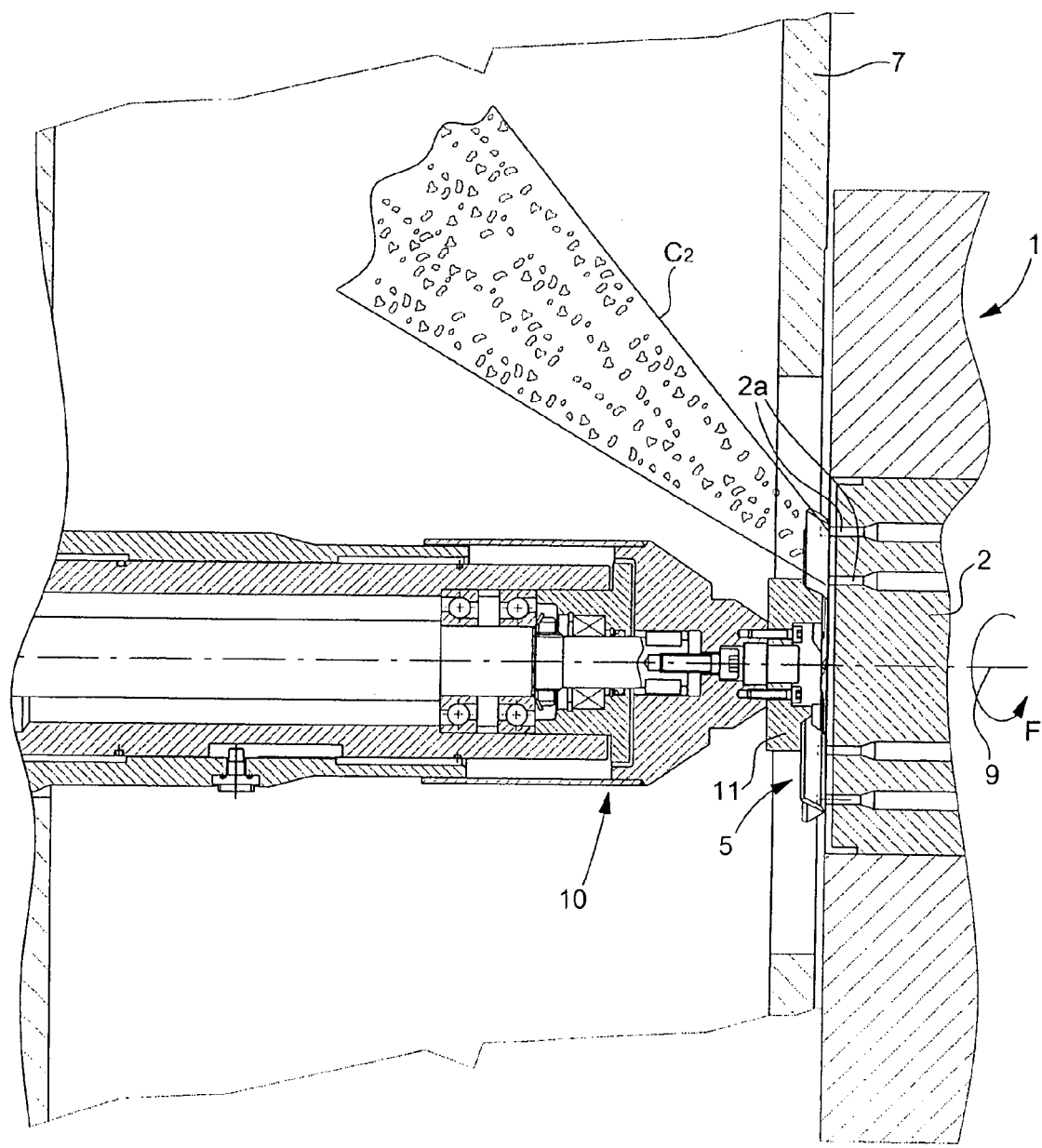

As depicted in FIGS. 4 to 6, the cutting head comprises three pairs of blades, the diametrically opposed blades of each pair having an angle of inclination $\alpha 1$, $\alpha 2$ and $\alpha 3$ of their inclined face with respect to the extrusion face of: $\alpha 1=35°$ (FIG. 3), $\alpha 2=40°$ (FIG. 4), and $\alpha 3=45°$ C. (FIG. 5), respectively. Such an arrangement makes it possible to achieve the desired objective of the invention, namely to improve the dispersion of the extruded products in the volume of the enclosure in as much as the extruded product is projected under vacuum at the moment of cutting, from each extrusion orifice, in three projection cones specific to the respective angles of the three pairs of cutter blades moving past these orifices. By way of example, FIGS. 7 and 8 depict the dispersion of the extruded products from two extrusion orifices aligned on the same radius of the extrusion die. As can be seen, the extruded products are ejected in two distinct projection cones C1 and C2 each corresponding to the cutting of these products by a respective one of two blades exhibiting different angles of inclination with respect to the extrusion face. Furthermore, this paired arrangement considerably simplifies the problems of the dynamic balancing of the cutting head in as much as the pairs of cutter blades balance each other.

It goes without saying that the present invention is not restricted to the embodiment which has just been described and that various simple modifications and variations may be envisaged by those skilled in the art without departing from the scope of the invention as defined by the attached claims. In particular, it may be envisaged to produce cutters in which the rear faces of the blades all have the same inclination with respect to the extrusion face but the cutting edges of which make different angles to the radii of the cutting head.

The invention claimed is:

1. Device for manufacturing a granular product comprising an extruder having at least one extrusion die comprising an extruder face in which extrusion orifices open, a rotationally driven cutting head comprising at least two cutter blades designed to move past the orifices, the blades are at least of two types and are arranged in such a way as to project the granular product, after cutting, in at least two different projection cones.

2. Device according to claim 1, wherein the cutter blades each have a first face facing the extrusion face and a second face intersecting the first face in such a way as to form a cutting edge and which is inclined with respect to the extrusion face, each type of blade differs from another type of blade in that the inclined second face of the blade has a different inclination.

3. Device according to claim 1, wherein two successive blades of the cutting head are of different types.

4. Device according to claim 1, wherein the cutting head comprises a plurality of blades arranged in pairs, the blades of the same type being diametrically opposite one another with respect to an axis of rotation of the cutting head.

5. Device according to claim 2, wherein the cutting angle for each blade is between 15° and 75°.

6. Device according to claim 5, wherein the cutting head comprises three pairs of blades, the blades of each pair having an angle of inclination of their inclined face with respect to the extrusion face of 35°, 40° and 45°, respectively.

7. A device for manufacturing a granular product comprising an extruder having at least one extrusion die and extrusion orifices, a rotationally driven cutting head comprising at least two different cutter blades that are so constructed and arranged as to project the granular product, after cutting, in at least two different projection cones.

8. Device according to claim 2, wherein the cutting angle for each blade is between 30° and 60°.

* * * * *